United States Patent
Doeberl et al.

(10) Patent No.: US 6,650,739 B1
(45) Date of Patent: Nov. 18, 2003

(54) METHOD OF PROVIDING PERSONAL MESSAGING USING A VIRTUAL MESSAGING ASSISTANT

(75) Inventors: Terrence M. Doeberl, West Redding, CT (US); Ronald P. Sansone, Weston, CT (US); Judith A. Martin, Stamford, CT (US); Nathaniel M. Gifford, Trumbull, CT (US); Shawn P. Uleske, Stamford, CT (US); Michael W. Wilson, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/221,550

(22) Filed: Dec. 28, 1998

(51) Int. Cl.[7] ............................. H04M 1/64; H04M 3/42
(52) U.S. Cl. ............................... 379/88.18; 379/88.01; 379/88.06; 379/88.12; 379/88.17; 379/201.01; 379/201.07; 379/265.01; 379/265.09
(58) Field of Search ......................... 379/88.01, 88.02, 379/88.03, 88.04, 88.05, 88.06, 88.07, 88.08, 88.13, 88.16, 88.17, 88.18, 201.01, 201.06, 201.07, 201.08, 207.12, 88.11, 265.01, 88.12, 265.08, 265.09, 265.14, 266.03

(56) References Cited

U.S. PATENT DOCUMENTS

| 5,651,055 A | * | 7/1997 | Argade ........................ 379/68 |
| 5,652,789 A | * | 7/1997 | Miner et al. ................. 379/201 |
| 5,742,905 A | * | 4/1998 | Pepe et al. ................... 455/461 |
| 5,859,967 A | | 1/1999 | Kaufeld et al. ............. 395/186 |
| 6,002,936 A | * | 12/1999 | Roel-Ng et al. ............. 455/456 |
| 6,005,928 A | | 12/1999 | Johnson ....................... 379/142 |
| 6,014,429 A | * | 1/2000 | LaPorta et al. ........... 379/88.15 |
| 6,240,069 B1 | * | 5/2001 | Alperovich et al. ........ 370/260 |

FOREIGN PATENT DOCUMENTS

WO  WO 99/21330  4/1999

* cited by examiner

Primary Examiner—Allan Hoosain
(74) Attorney, Agent, or Firm—Charles R. Malandra, Jr.; Angelo N. Chaclas

(57) ABSTRACT

This invention overcomes the disadvantages of the prior art by providing automated personal messaging assistance with the capability of checking a user's destination for arrival and forwarding messages by a preferred modality. The present invention is directed to, in a general aspect, a method of providing personal messaging using a virtual messaging assistant. The virtual messaging assistant has a voice user interface and provides a human-like voice which interfaces with the user' and with callers. The personal messaging assistant provides forwarding of messages to a destination in accordance with user selected preferences. The personal messaging assistant receives incoming messages. The personal messaging checks the user's calendar to find out where the user is expected to be. Then the personal messaging assistant calls the expected destination and inquires whether the user has arrived. If the user has arrived, the personal messaging assistant forwards messages by a preferred mode, such as, for example, via facsimile, to the destination. The personal messaging assistant handles important confidential messages by making sure that the user is at the destination prior to forwarding those messages. Thus, the user is provided with a service was previously unavailable in a continuous manner.

10 Claims, 2 Drawing Sheets

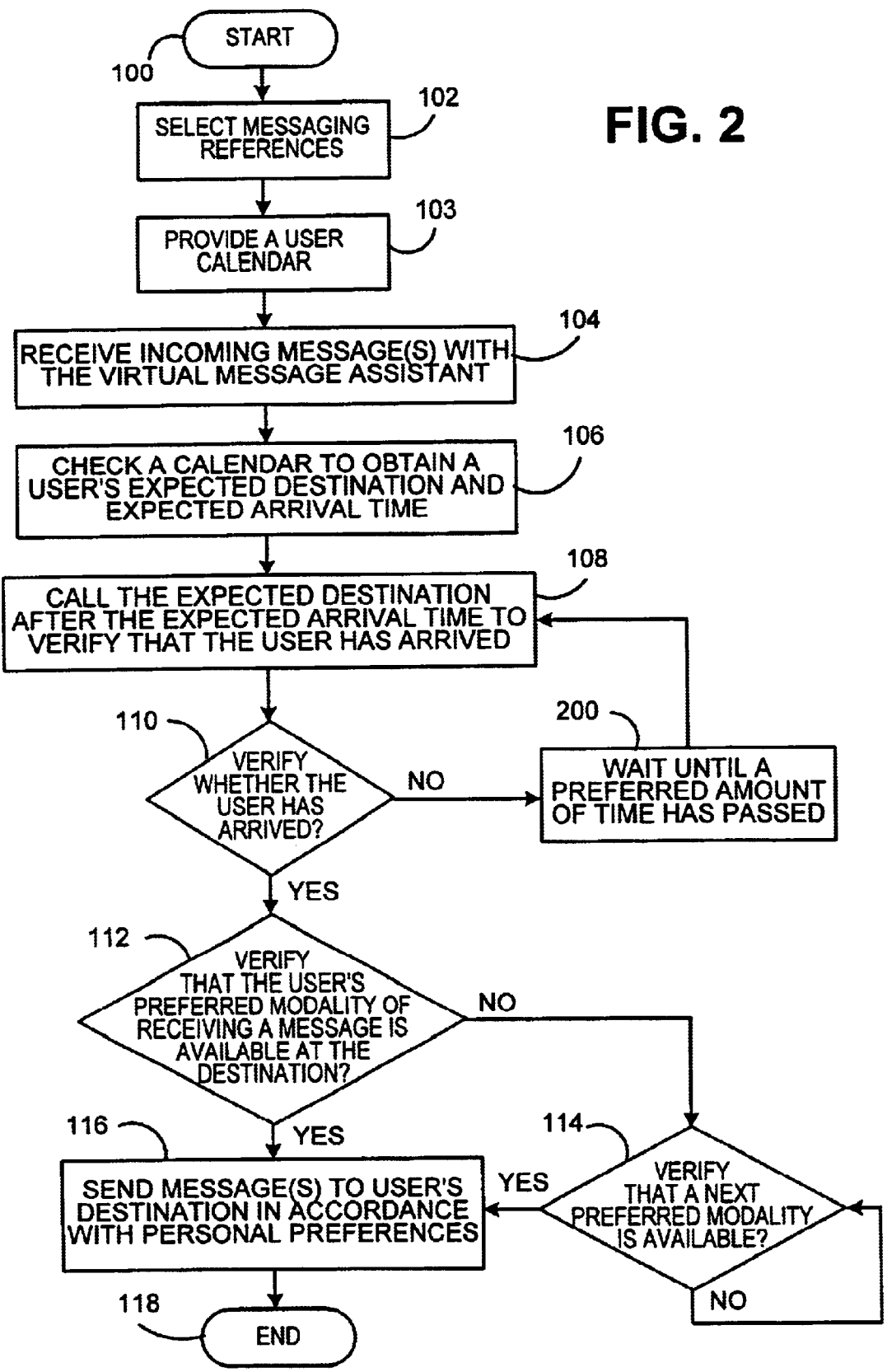

METHOD OF PROVIDING PERSONAL MESSAGING USING A VIRTUAL MESSAGING ASSISTANT

FIELD OF THE INVENTION

The invention disclosed herein relates generally to virtual assistants and, more particularly to a personal messaging assistant for locating a recipient and sending a message in accordance with the recipient's instructions.

BACKGROUND OF THE INVENTION

Present messaging technology allows a mobile worker, or other messaging technology user, to receive communications via email, fax, wireless telephone, conventional telephone, voice mail and paging. Commercially available electronic or virtual assistants provide an answering service of sorts for the mobile worker and integrate the receipt of messages via the aforementioned messaging technologies thus allowing a mobile worker to receive messages through a single point of service. The mobile worker can call the virtual messaging assistant and, via a voice user, interface, retrieve and answer messages received via various technology.

The virtual assistant, such as, for example, PORTICO™ by General Magic Inc. of Sunnyvale California, provides information and messaging management services for receiving voice mail, email, outgoing faxes, calendar information, address book information and newspaper stories. The service receives the aforementioned information with the assistance of a voice user interface and provides the information to the mobile user via telephone or web browser. Calendar, address and telephone information and other personal information is provided to the system through the use of a Personal Information Manager (PIM) accessory such as, for example, Microsoft Outlook™, or through the use of an electronic organizer, such as, for example, a PalmPilot™. These systems are interfaced with the virtual assistant and information is downloaded to the virtual assistant database. Virtual assistant technology has made the mobile worker's message management easier but has not solved some of the mobile worker's messaging problems, such as, for example, the need to have the mobile worker's itinerary checked and have communications delivered to the mobile worker at the worker's destination. Another problem that has not been solved is the need for the mobile worker to set messaging preferences and have messages delivered according to those preferences.

Prior to the availability of virtual assistants, a mobile worker was dependent upon a personal administrative assistant maintaining the mobile worker's office, answering the mobile worker's telephone, and forwarding the mobile worker's messages, etc. However, administrative assistants are not generally available 24 hours a day, 7 days a week and therefore, the mobile worker has been, at times, unable to obtain messages received by certain messaging technology, such as a fax; the fax document can be waiting at the mobile worker's office and the administrative assistant could be unavailable to forward it to the mobile worker. Also, the mobile worker has been unable to have an assistant available 24 hours a day, 7 days a week to prioritize and forward messages as needed.

Services have been available for a number of years to cater to mobile workers' needs by providing solutions and adapting to unique issues created by travel, scheduling and work styles. One such service is The Central Office™ of Santa Rosa, Calif. which provides mobile workers with postal addresses, receives, opens and scans mail, encrypts scanned mail, forwards scanned mail to the mobile worker's email address, and forwards the received/opened mail to a desired address. The service will also prepare and deposit checks. The mobile worker receives scanned mail by accessing an email account. The service gives the mobile worker the flexibility to travel and receive mail without visiting a physical address. The Central Office™ is a service business and mobile workers are charged a fee based upon the number of pages scanned per month.

While virtual assistant technology has made the messaging of the mobile worker more manageable, a method and system are needed which receive messages and process those messages according to personal preferences of the mobile worker. Thus, one of the problems of the prior art is that it is unable to process messages according to user preferences and forward those messages to a user's destination. Another problem of the prior art is that administrative assistance is not available 24 hours a day, 7 days a week. Another problem of the prior art is that the mobile worker's plans frequently change and there is no means by which a virtual assistant can check to verify that the mobile worker has arrived at his or her scheduled destination, prior to forwarding messages and other information. Another problem of the prior art is that there is no means by which a virtual assistant can check for the mobile worker's arrival before forwarding sensitive material.

SUMMARY OF THE INVENTION

This invention overcomes the disadvantages of the prior art by providing automated personal messaging assistance with the capability of processing messages in accordance with a user's personal preferences, including checking a user's destination for arrival and forwarding messages by a preferred modality. The present invention is directed to, in a general aspect, a method of providing personal messaging using a virtual messaging assistant. The virtual messaging assistant has a voice user interface and provides a human-like voice which interfaces with the user and with callers. The personal messaging assistant provides messaging assistance in accordance with user selected preferences. The personal messaging assistant provides forwarding of messages to a destination in accordance with user selected preferences. The personal messaging assistant receives incoming messages. The personal messaging checks the user's calendar to find out where the user is expected to be. The personal messaging assistant then calls the expected destination and inquires whether the user has arrived. If the user has arrived, the personal messaging assistant forwards messages by a preferred mode, such as, for example, via facsimile, to the destination. The personal messaging assistant handles important confidential messages by making sure that the user is at the destination prior to forwarding those messages. Thus, the user is provided with a service which was previously unavailable in a continuous manner.

The method of the present invention provides mobile workers and other users with an efficient way of handling messages. Another advantage of the present invention is that the personal messaging assistant gives the user the ability to avoid situations where important confidential information is forwarded to an expected destination to which the user never arrives. Another advantage of the present invention is that the user is afforded personal messaging assistants 24 hours a day, 7 days a week without the expense of hiring one or more administrative assistants to be available around the clock. Other advantages of the invention will in part be obvious and will in part be apparent from the specification. The aforementioned advantages are illustrative of the advantages of the various embodiments of the present invention.

DESCRIPTION OF THE DRAWINGS

FIG. 2 is a flowchart illustrating the steps of one embodiment of the present invention.

DETAILED DESCRIPTION OF THE PRESENT INVENTION

Figure 1:
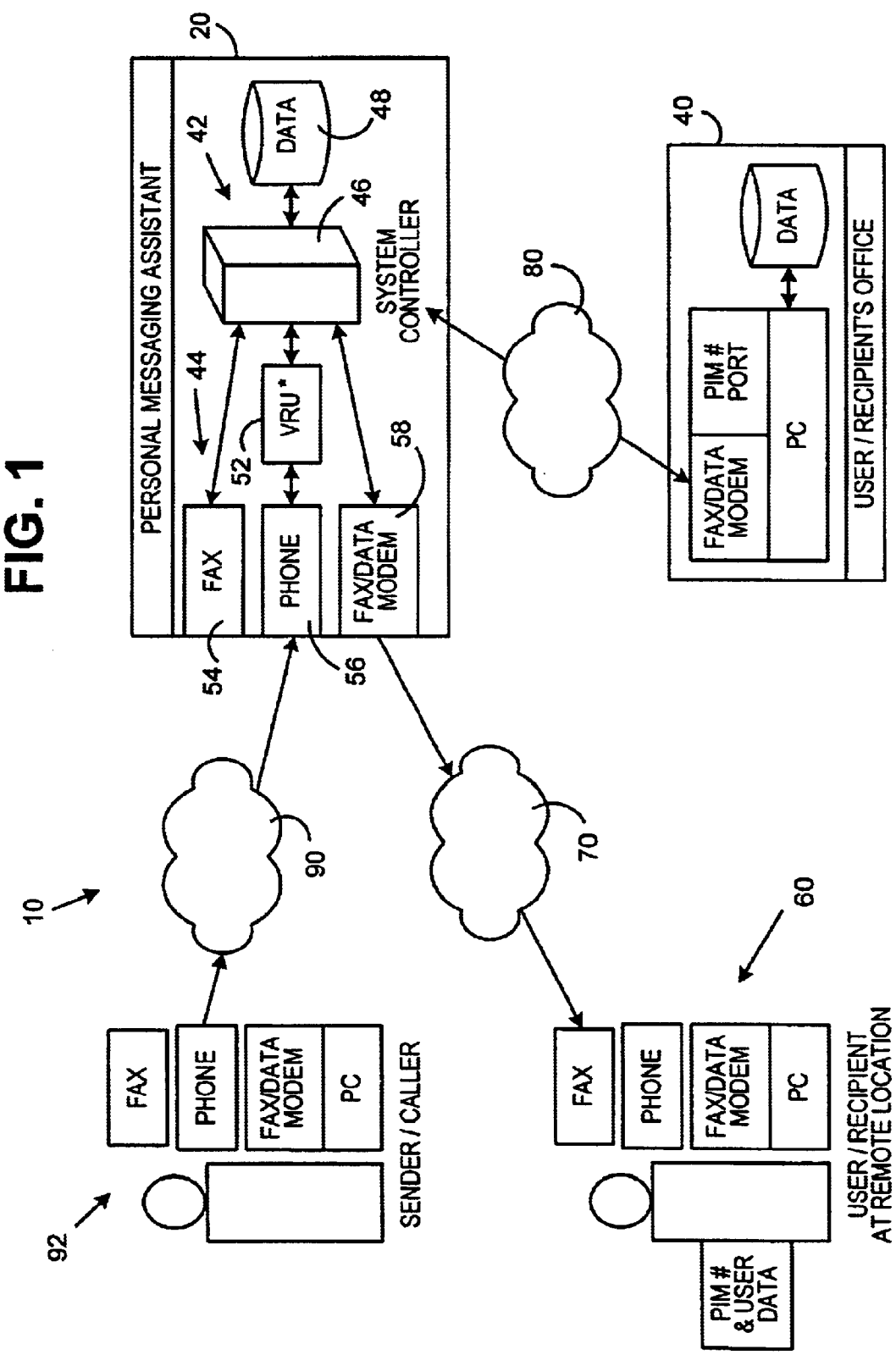
FIG. 1 is a block diagram of a personal messaging assistant system on which an embodiment of the present invention can be performed.

In describing the present invention, reference will be made herein to FIGS. 1–2 of the drawings in which like numerals refer to like features of the present invention.

FIG. 1 is a block diagram of a personal messaging assistant system 10 on which an embodiment of the present invention can be performed. The personal messaging assistant comprises a virtual assistant system 20, a stationary user office 40, and mobile user office 60. The virtual assistant system comprises a computer system 42 and a message receiving system 44. The computer system 42 comprises a processor 46, a data storage memory 48 and a voice response unit 52 or voice user interface. The message receiving system 44 comprises a fax receiver 54, a telephone receiver 56, a modem 58. The message receiving system could also comprise a networked processor with email receiving capability, and/or a wireless paging receiver. The voice user interface 52 has a natural voice and allows the user and callers to use their own words when interfacing with the personal messaging assistant.

The virtual assistant system 20 is interfaced with the recipient/user's stationary office 40 via network 90 and with the user's mobile office 60 via network 70. A caller 92 can access the user's virtual assistant system 20 via network 80. The caller may communicate via any form of communication acceptable to the virtual assistant system's 20 message receiving system 42. Each network used for interfacing with the virtual assistant system 20 could be, for example, a computer network such as the Internet, a telecommunications network, or other suitable communications network. The block diagram of FIG. 1 illustrates a caller sending a message to the user via telephone; the personal messaging assistant receives the telephone message and transmits the telephone message by fax to the user at a remote location. The personal messaging assistant can receive messages by one modality and send messages to the user by another modality, such as a user preferred forwarding modality. The virtual assistant system can be, for example, PORTICO by General Magic, Inc. of Sunnyvale, Calif.

The personal messaging assistant can direct messages in accordance with user selected preferences. User selected preferences can include the mode of message delivery, delivery based upon the identification of the sender, delivery based upon whether a message from the sender is expected, delivery based upon the location of the user, delivery based upon the time of day, delivery based upon the activity of the user. The user's activity and the user's location can be determined by checking the user's calendar. The user's location could also be determined from a global positioning signal provided to the personal messaging assistant. The signal could be provided, for example, by a global positioning system (GPS) interfaced with an electronic organizer. The personal messaging assistant could also learn the user's behavior patterns and make personal messaging decisions for the user based upon those behavior patterns.

FIG. 2 is a flowchart illustrating the steps of one embodiment of the present invention. At step 100, the method begins. At step 102, messaging preferences are selected. At step 103, a user's calendar is provided. At step 104, at least one incoming message is received with the virtual message assistant. At step 106, the calendar is checked to obtain a user's expected destination and expected arrival time. At step 108, the user's expected destination is called after the expected arrival time to verify that the user has arrived. At step 110, the user's arrival is verified or not verified. If the user has not arrived, the method can take several courses of action which will be addressed below. If the user has arrived, at step 112 the user's preferred modality of receiving messages is verified or not verified. If the user's preferred modality is verified, then at step 114 the messages are sent to the user's destination in accordance with the user's preferences. If the modality was not verified, then in step 116, the availability of a next preferred modality is checked.

If the result of step 110 is that the user has not arrived at the expected destination, alternate steps can be taken in accordance with the user's preferences. For example, at step 200, the personal messaging assistant can wait until a preferred amount of time, for example, 30 minutes, has passed and repeat step 108, by calling the expected destination. Alternately, the personal messaging assistant could call the user and ask the user what should be done with the messages; the personal messaging assistant could process the messages in accordance with the user's instructions. Another alternative of processing the messages when the user has not arrived is to have the personal messaging assistant leave a message at the expected destination, for the user to call the personal messaging assistant upon arrival and give the personal messaging assistant instructions. Another alternate method of processing when the user has not arrived at the expected destination is to have the personal messaging assistant contact the user and ask the user how the messages should be processed. The messages are then processed in accordance with the user's instructions. If the user's arrival is verified at step 110, then the user's preferred modality is verified or not verified at step 112. If the user's preferred modality is not verified, than at step 114, a next preferred modality is checked until a modality is verified. If no modality is available, the method could contact the user. If the preferred modality is verified, at step 116, the message(s) are sent to the destination.

User preferences comprise 1) preferred mode or modes of receiving forwarded messages; 2) message delivery priorities based upon identification of the sender of the message; 3) message delivery priorities based upon the identification of the message as a message that is expected by the user; 4) message delivery priorities based upon the location of the user; 6) message delivery priorities based upon the time of day; and 7) message delivery priorities based upon the activity of the user.

The user can specify the preferred mode or modes or a preferred hierarchy of modes with which messages can be forwarded. The modes comprise fax, telephone and electronic mail. The user could also specify that paging should be used and that the user will call the personal messaging assistant to receive messages. Messages can be prioritized normal, urgent and "no forwarding required". The prioritization and delivery of messages can be based upon the identification of the sender. For example, all message received from a user's spouse could be prioritized as urgent and forwarded immediately. The sender could be identified, for example, using voice matching or caller identification. The prioritization of messages can also be based upon the identification of a message as one that is expected by the user. For example, if the user is expecting a message from a particular client, those messages are forwarded to the user. The sender could be identified, for example, using voice matching or caller identification. The forwarding of messages can be based upon the location of the user. For example, if the user is in an airplane, the personal messaging assistant would know from the user's calendar that the user is in an airplane and unable to receive forwarded calls. Or, for example, if the user is in an important business meeting, the user does not want calls forwarded until after the meeting is over. The forwarding of messages could also be based upon the time of day. For example, the user does not want calls forwarded during the dinner hour of 6:00 p.m. The forwarding of messages could also be based upon the activity of the user. For example, if the user is on a date, the personal messaging assistant would know, from the user's calendar, that the user does not want calls forwarded. Another forwarding feature can be that once the personal messaging assistant has verified that the user has arrived at the destination, the personal messaging assistant can redirect the user's calls to the destination.

Calendaring functions can be provided through the user of a Personal Information Manager (PIM) accessory such as, for example, Microsoft Outlook™, or through the use of an electronic organizer, such as, for example, a PalmPilot™. PIMs and electronic organizers can interface with the virtual assistant and calendar information, as well as telephone numbers and other personal information can be saved in the memory of the personal messaging assistant.

In one embodiment, the personal messaging assistant, using artificial intelligence, such as a neural network, could perform pattern recognition and learn the user's behaviors. For example, the personal messaging assistant could learn that the user always arrives at an expected destination 20 minutes late and therefore, the personal messaging assistant will not contact the expected destination to verify the user's arrival until 20 minutes after the user's scheduled arrival time.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

We claim:

1. A method of providing personal messaging using a virtual messaging assistant with a voice user interface system comprising the steps of:

a) providing a personal messaging assistant that can be set with messaging preferences of a user and interact with a user calendar and user contact information;

b) selecting messaging preferences for processing messages;

c) receiving an incoming message for the user;

d) checking the user calendar to obtain the user's expected destination;

e) calling the user's expected destination f) verifying that the user has arrived at the expected destination;

g) verifying that the preferred modality is available at the destination;

h) transmitting the message to the destination;

(i) recognizing the user's behavior patterns associated with the user's arrival at the expected destination; and (j) adjusting the verification process of step (f) in accordance with the user's behavior patterns, wherein in step (i), the virtual messaging assistant recognizes that the user arrives late to expected destinations and adjusts the verification process to call the expected destination at a time later than the expected arrival time and based upon the amount of time that the user habitually arrives late.

2. The method of providing personal messaging using the virtual messaging assistant claimed in claim 1, wherein in step (b) the preferences comprise at least one mode of receiving messages from the virtual messaging assistant.

3. The method as claimed in claim 2, wherein the modes of receiving messages comprise telephone, facsimile, wireless paging and email.

4. The method of providing personal messaging using the virtual messaging assistant claimed in claim 1, wherein in stop (b) the preferences comprise message delivery priorities based upon a location of the user.

5. The method as claimed in claim 4, whereby the location of the user is determined by checking the user's calendar.

6. The method of providing personal messaging using the virtual messaging assistant claimed in claim 1, wherein in step (b) the preferences comprise message delivery priorities based upon an activity of the user.

7. The method as claimed in claim 6, whereby the activity of the user is determined by checking the user's calendar.

8. The method of providing personal messaging claimed in claim 1, wherein in step (g), if the preferred modality is not available at the destination, the method further comprises the step of verifying a next preferred modality.

9. The method of providing personal messaging claimed in claim 1, wherein In step (h) If the user has not arrived at the expected destination, a preferred time amount will elapse, and the virtual messaging assistant will perform step (g) again.

10. The method of providing personal messaging claimed in claim 1, wherein in step (h), if the user has not arrived at the expected destination, the virtual messaging assistant contacts the user and requests instructions for processing messages.

* * * * *